(12) United States Patent
Miyazawa (10) Patent No.: US 9,919,680 B2
(45) Date of Patent: Mar. 20, 2018

(54) KEYLESS ENTRY SYSTEM AND VEHICLE-MOUNTED DEVICE

(71) Applicant: Alps Electric Co., Ltd., Ota-ku, Tokyo (JP)

(72) Inventor: Akira Miyazawa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 15/442,328

(22) Filed: Feb. 24, 2017

(65) Prior Publication Data

US 2017/0291579 A1    Oct. 12, 2017

(30) Foreign Application Priority Data

Apr. 11, 2016    (JP) .................................. 2016-078970

(51) Int. Cl.
| | |
|---|---|
| *G06F 21/00* | (2013.01) |
| *B60R 25/24* | (2013.01) |
| *H04B 17/318* | (2015.01) |
| *G07C 9/00* | (2006.01) |

(52) U.S. Cl.
CPC .......... *B60R 25/24* (2013.01); *G07C 9/00309* (2013.01); *H04B 17/318* (2015.01); *G07C 2009/00325* (2013.01)

(58) Field of Classification Search
None
See application file for complete search history.

(56) References Cited

U.S. PATENT DOCUMENTS

| | | | | |
|---|---|---|---|---|
| 7,224,980 | B2* | 5/2007 | Hara ....................... | B60R 25/24 340/10.1 |
| 7,751,957 | B2* | 7/2010 | Nagaoka ................. | B60R 25/24 455/92 |
| 7,915,998 | B2* | 3/2011 | Matsubara ......... | G07C 9/00309 340/5.1 |
| 8,044,771 | B2 | 10/2011 | Nakajima et al. | |
| 8,155,827 | B2* | 4/2012 | Nakajima ............... | B60R 25/24 340/426.16 |
| 2004/0183714 | A1* | 9/2004 | Yamashita .............. | B60R 25/24 342/70 |

FOREIGN PATENT DOCUMENTS

JP    2008-266955    11/2008

* cited by examiner

*Primary Examiner* — K. Wong
(74) *Attorney, Agent, or Firm* — Beyer Law Group LLP (57) ABSTRACT

A vehicle-mounted device includes a control unit that generates a request signal, a transmission unit that sequentially transmits a request signal generated by the control unit from a plurality of respective transmission antennas, a reception unit that receives a response signal to the request signal, and a storage unit that stores a history of information included in a response signal received by the reception unit, and, in a case where the response signal is newly received by the reception unit, the control unit determines whether or not a vehicle is caused to perform a predetermined operation on the basis of the information included in the response signal and the history of the information included in the response signal stored in the storage unit.

12 Claims, 5 Drawing Sheets

HISTORY INFORMATION

| HISTORY ID | RECEPTION STRENGTH OF REQUEST SIGNAL | | | | |
|---|---|---|---|---|---|
| | TRANSMISSION ANTENNA 102a | TRANSMISSION ANTENNA 102b | TRANSMISSION ANTENNA 102c | TRANSMISSION ANTENNA 102d | TRANSMISSION ANTENNA 102e |
| 1 | AAA | BBB | CCC | DDD | EEE |
| 2 | ABA | BCB | CDC | DED | EAE |
| 3 | CAB | DAC | BCA | DAB | EAC |
| ⋮ | ⋮ | ⋮ | ⋮ | ⋮ | ⋮ |

KEYLESS ENTRY SYSTEM AND VEHICLE-MOUNTED DEVICE

CLAIM OF PRIORITY

This application claims benefit of Japanese Patent Application No. 2016-078970 filed on Apr. 11, 2016, which is hereby incorporated by reference.

BACKGROUND OF THE INVENTION

1. Field of the Invention

An embodiment of the present invention relates to a keyless entry system and a vehicle-mounted device.

2. Description of the Related Art

A keyless entry system in which wireless communication is performed between a vehicle-mounted device provided in a vehicle and a portable device carried by a user to lock or unlock doors of the vehicle is known. Further, a passive keyless entry device in which communication is performed between a vehicle-mounted device and a portable device if the portable device approaches a vehicle, and doors of the vehicle are locked or unlocked by authenticating an ID uniquely set for each portable device is also known.

For a passive keyless entry device, a technology for discriminating whether a portable device is outside or inside a vehicle is known (See, for example, Japanese Unexamined Patent Application Publication No. 2008-266955).

In a case where a third malicious party places a relay device relaying a radio signal between a portable device and a vehicle-mounted device, wireless communication can be performed between the portable device and the vehicle-mounted device even when the portable device is at a position far away from the vehicle-mounted device. As a result, an operation such as unlocking of a door of the vehicle may be performed despite no intension of a user. Thus, a scheme of operating the vehicle by performing wireless communication between the portable device and the vehicle-mounted device via the relay device is called relay attack.

SUMMARY OF THE INVENTION

The present invention prevents a vehicle from being operated by a fraudulent action.

(1) An aspect of the present invention is a keyless entry system including a vehicle-mounted device and a portable device, the vehicle-mounted device including: a first control unit that generates a request signal; a first transmission unit that sequentially transmits a request signal generated by the first control unit from a plurality of respective transmission antennas; a first reception unit that receives a response signal to the request signal; and a storage unit that stores a history of information included in the response signal received by the first reception unit, in which, in a case where the response signal is newly received by the first reception unit, the first control unit determines whether or not the vehicle is caused to perform a predetermined operation on the basis of the information included in the response signal and the history of the information included in the response signal stored in the storage unit, and the portable device includes: a second reception unit that receives the request signal sequentially transmitted by the plurality of respective transmission antennas of the vehicle-mounted device; a second control unit that generates a response signal including information generated on the basis of the request signal received by the second reception unit; and a second transmission unit that transmits the response signal generated by the second control unit.

(2) According to an aspect of the present invention, in the keyless entry system, the second control unit may generate a response signal including the reception characteristics of the request signal on the basis of the request signal received by the second reception unit, the storage unit may store a history of the reception characteristics included in the response signal received by the first reception unit, and in a case where the response signal is newly received by the first reception unit, the first control unit may determine whether or not the vehicle is caused to perform a predetermined operation on the basis of the reception characteristics included in the response signal and the history of the reception characteristics stored in the storage unit.

(3) According to an aspect of the present invention, in the keyless entry system, a reception characteristic of the request signal may be reception strength of the request signal.

(4) According to an aspect of the present invention, in the above keyless entry system, the first control unit may determine that a predetermined operation is performed in a case where a fluctuation amount in the reception characteristics included in the response signal relative to the reception characteristics included in the history of the reception characteristics stored in the storage unit is equal to or smaller than a threshold value.

(5) According to an aspect of the present invention, in the keyless entry system, the second control unit may generate a response signal including the reception characteristics of the request signal on the basis of the request signal received by the second reception unit, the storage unit may store a history of the reception characteristics included in the response signal received by the first reception unit, and in a case where the response signal is newly received by the first reception unit, the first control unit may determine whether or not the vehicle is caused to perform a predetermined operation on the basis of a value estimated on the basis of the reception characteristics of the request signal transmitted from each of the plurality of the transmission antennas included in the response signal and a value estimated on the basis of the history of the reception characteristics stored in the storage unit.

(6) According to an aspect of the present invention, in the keyless entry system, the second control unit may generate a response signal including the reception characteristics of the request signal on the basis of the request signal received by the second reception unit, the storage unit may store a history of a value estimated on the basis of the reception characteristics included in the response signal received by the first reception unit, and in a case where the response signal is newly received by the first reception unit, the first control unit may determine whether or not the vehicle is caused to perform a predetermined operation on the basis of a value estimated on the basis of the reception characteristics of the request signal transmitted from each of the plurality of the transmission antennas included in the response signal and the history of the estimated value stored in the storage unit.

(7) According to an aspect of the present invention, in the keyless entry system, the second control unit may generate a response signal including a value estimated on the basis of the request signal received by the second reception unit, the storage unit may store a history of the estimated value included in the response signal received by the first reception unit, and in a case where the response signal is newly received by the first reception unit, the first control unit may determine whether or not the vehicle is caused to perform a predetermined operation on the basis of the estimated value included in the response signal and the history of the estimated value stored in the storage unit.

(8) According to an aspect of the present invention, in the keyless entry system, the estimated value may be any one of a distance from a reference position, a position of the portable device, and a direction from the reference position.

(9) According to an aspect of the present invention, there is provided a vehicle-mounted device, including: a control unit that generates a request signal; a transmission unit that sequentially transmits a request signal generated by the control unit from a plurality of respective transmission antennas; a reception unit that receives a response signal to the request signal; and a storage unit that stores a history of information included in the response signal received by the reception unit, in which, in a case where the response signal is newly received by the reception unit, the control unit determines whether or not the vehicle is caused to perform a predetermined operation on the basis of the information included in the response signal and the history of the information included in the response signal stored in the storage unit.

According to the embodiment of the present invention, it is possible to prevent the vehicle from being operated by a fraudulent action.

DESCRIPTION OF THE PREFERRED EMBODIMENTS

Next, embodiments of the present invention will be described with reference to the drawings. The embodiments to be described below are merely examples, and embodiments to which the present invention is applied are not limited to the following embodiments.

In all the drawings for describing the embodiments, components having the same functions are denoted with the same reference numerals, and repeated description will be omitted.

First Embodiment

Figure 1:
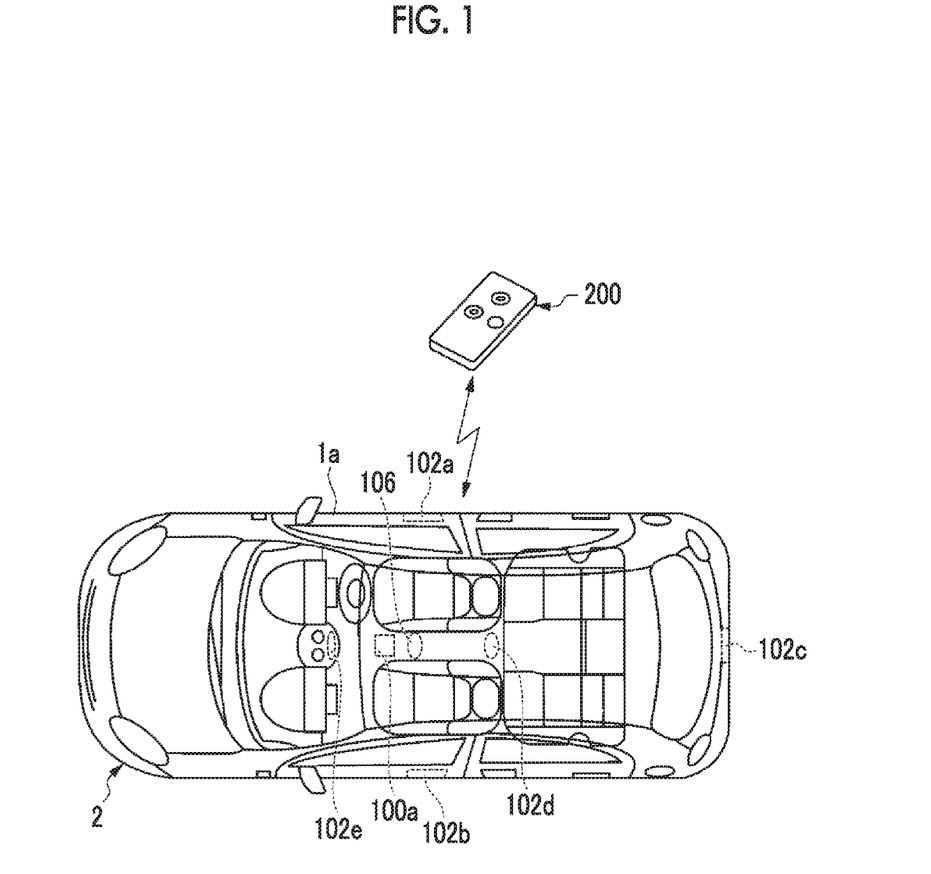
FIG. 1 is a schematic diagram of a keyless entry system according to an embodiment.

FIG. 1 illustrates an overview of a vehicle having a keyless entry system mounted thereon according to a first embodiment. The keyless entry system includes a portable device 200 and a vehicle-mounted device. The portable device 200 is carried by a user, and the vehicle-mounted device is installed in a vehicle 2.

The vehicle-mounted device includes five transmission antennas and one reception antenna. In the example illustrated in FIG. 1, a transmission antenna 102a is provided near a door outer handle of a right front door, a transmission antenna 102b is provided near a door outer handle of a left front door, and a transmission antenna 102c is provided near a door outer handle of a rear gate door. Further, in a vehicle interior, a transmission antenna 102d and a reception antenna 106 are provided between a driver's seat and a passenger's seat, and a transmission antenna 102e is provided in a portion of a dashboard. Further, in the vehicle interior, a circuit unit 100a of the vehicle-mounted device is provided between the driver's seat and the passenger's seat. Hereinafter, in a case where the transmission antennas 102a to 102e are not distinguished, the transmission antennas 102a to 102e are referred to as a transmission antenna 102.

By the portable device 200 and the vehicle-mounted device performing wireless communication, authentication, a command to cause the vehicle 2 to perform a predetermined operation, or the like is performed, and the vehicle 2 executes the predetermined operation. For example, operation switches for start and stop of an engine, locking and unlocking of doors, and the like are provided in the vehicle 2, and the predetermined operation can be performed by pressing the operation switch. When the operation switch is pressed by the user, request signals are sequentially transmitted from the plurality of respective transmission antennas 102. The portable device 200 sequentially receiving the request signal measures reception characteristics such as reception strength of the request signal (RSSI: Received Signal Strength Indication, Received Signal Strength Indicator). The portable device 200 generates a response signal including information indicating the reception characteristics of the request signal transmitted from each of the plurality of transmission antennas 102 and an ID (hereinafter referred to as an "authentication ID") of the portable device 200, and transmits the response signal to the vehicle-mounted device.

The vehicle-mounted device stores IDs (hereinafter referred to as "registration IDs") of one or a plurality of portable devices capable of operating the vehicle having the vehicle-mounted device mounted thereon, and history information of the reception characteristics included in the response signal transmitted by the portable device 200. If the vehicle-mounted device newly receives the response signal transmitted by the portable device 200, the vehicle-mounted device acquires the authentication ID and the reception characteristics included in the response signal. The vehicle-mounted device collates the authentication ID with the registration ID. In a case where the authentication ID is included in the registration ID as a result of collating the authentication ID with the registration ID, the vehicle-mounted device determines whether or not the vehicle 2 is caused to perform the operation requested by pressing the operation switch on the basis of the reception characteristics included in the response signal and the stored history of the reception characteristics.

Hereinafter, a case where an operation of starting up the engine is applied as an example of the predetermined operation and reception strength is applied as an example of the reception characteristics will be described. Further, an engine start switch is applied as an example of the operation switch.

Configuration of Keyless Entry System

Figure 2:
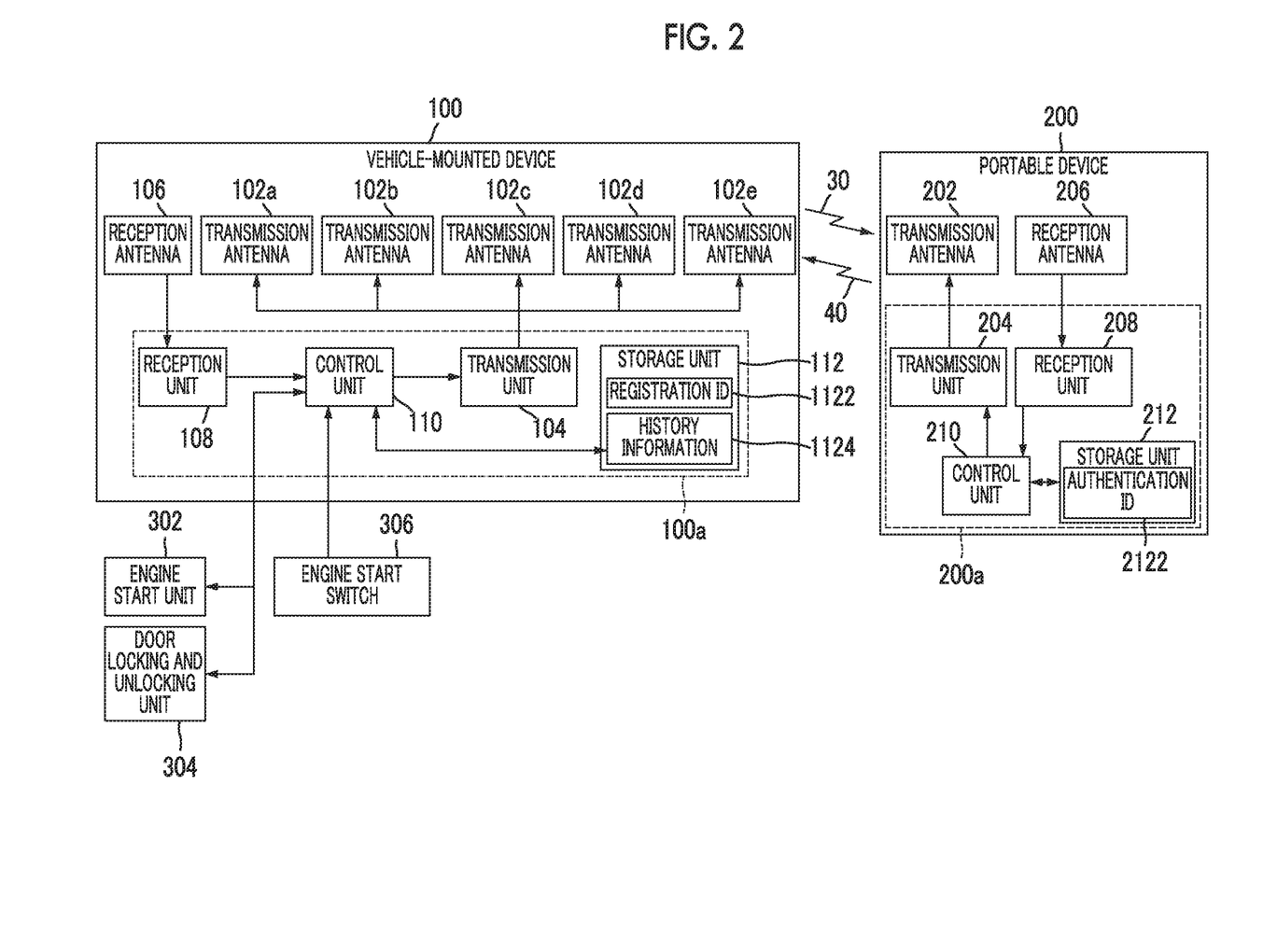
FIG. 2 is a block diagram of the keyless entry system according to the embodiment.

FIG. 2 illustrates an example of a vehicle-mounted device 100 and a portable device 200 constituting the keyless entry system according to the embodiment. The vehicle-mounted device 100 and the portable device 200 are connected by performing wireless communication. The vehicle-mounted device 100 transmits a request signal 30, and the portable device 200 transmits a response signal 40 to the request signal.

Configuration of Vehicle-Mounted Device

The vehicle-mounted device 100 includes transmission antennas 102 (102a, 102b, 102c, 102d, and 102e), a reception antenna 106, and a circuit unit 100a. The circuit unit 100a includes a transmission unit 104, a reception unit 108, a control unit 110, and a storage unit 112. An engine start unit 302, a door locking and unlocking unit 304, and an engine start switch 306 are connected to the control unit 110.

The control unit 110 includes an arithmetic processing unit such as a central processing unit (CPU). If the user presses the engine start switch 306, an engine start request is supplied to the control unit 110. If the engine start request is supplied from the engine start switch 306, the control unit 110 generates a request signal and outputs the request signal to the transmission unit 104. Further, the control unit 110 may generate the request signal periodically as well as in a case where the engine start request is supplied from the engine start switch 306, and output the request signal to the transmission unit 104.

The transmission unit 104 includes a transmitter and is connected to the control unit 110. If the request signal is supplied by the control unit 110, the transmission unit 104 sequentially outputs the request signal to the transmission antenna 102a, the transmission antenna 102b, the transmission antenna 102c, the transmission antenna 102d, and the transmission antenna 102e.

The transmission antenna 102 is connected to the transmission unit 104. The transmission antenna 102 transmits the request signal supplied from the transmission unit 104 at a frequency in a low frequency (LF) band or a very low frequency (VLF) band. For example, frequencies within 20 kHz to 300 kHz are used.

Example of Transmission of Request Signal

Figure 3:
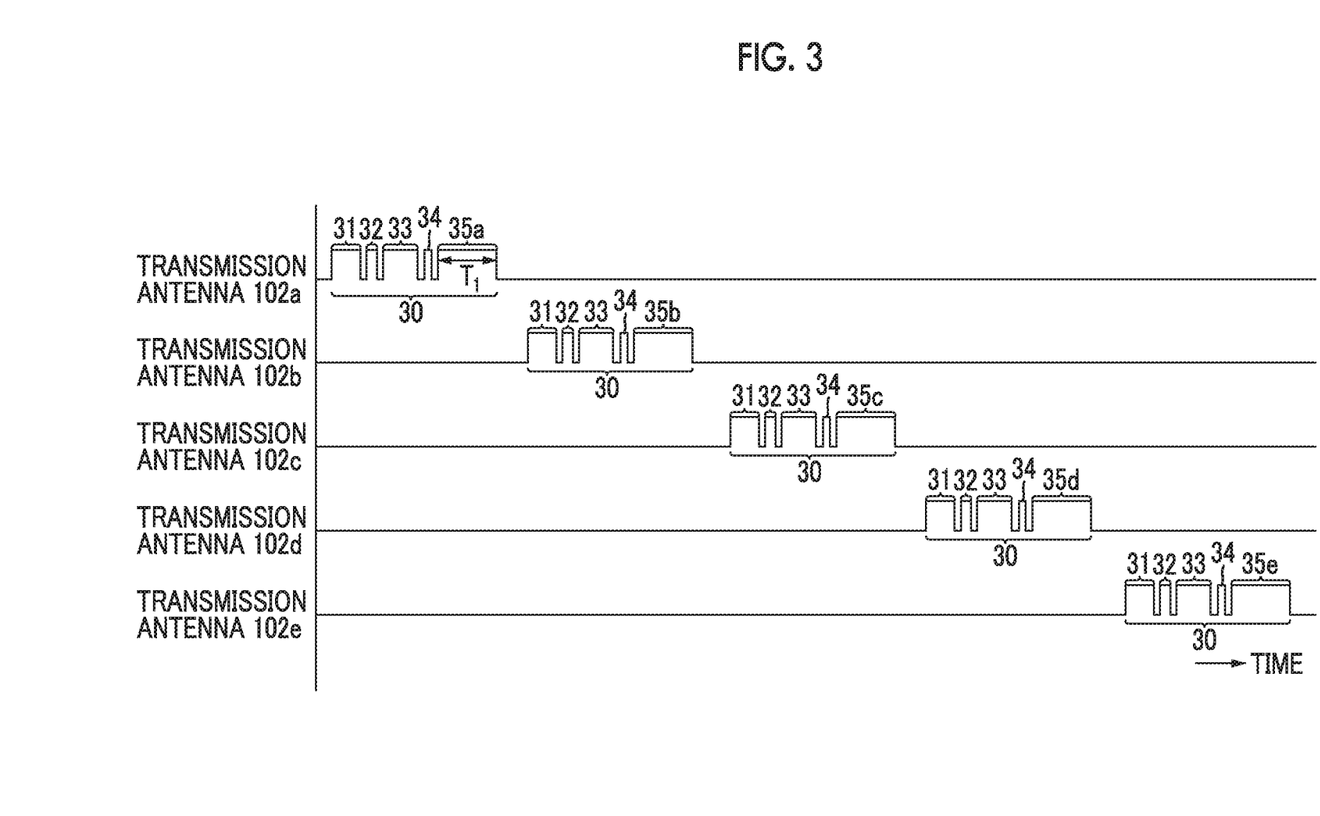
FIG. 3 is a diagram illustrating an example of a request signal transmitted by a vehicle-mounted device according to the embodiment.

FIG. 3 illustrates an example of transmission of the request signal. In FIG. 3, a horizontal axis indicates time and a vertical axis indicates the request signal 30 transmitted by each of the plurality of transmission antennas 102. The transmission unit 104 sequentially transmits the request signal 30 in the LF band from the plurality of respective transmission antennas 102.

The request signal 30 includes a wakeup signal 31, a synchronization signal 32, a command signal 33, a timing signal 34, and a measurement signal 35 (35a, 35b, 35c, 35d, and 35e). As the wakeup signal 31 is transmitted from the vehicle-mounted device 100, the portable device 200 that has received the wakeup signal 31 wakes up from a sleep state. Further, as the command signal 33 is transmitted from the vehicle-mounted device 100, the portable device 200 that has received the command signal 33 can determine whether or not to transmit a response signal to the vehicle-mounted device 100 by collating a vehicle-specific identification code included in the command signal 33 with identification information stored in the portable device 200. The portable device 200 determines to transmit the response signal in a case where the vehicle-specific identification code matches the identification information stored in the portable device 200, and determines not to transmit the response signal in a case where the vehicle-specific identification code does not match the identification information. Further, as the timing signal 34 is transmitted from the vehicle-mounted device 100, it can be seen that a signal for reception strength measurement then continues. The portable device 200 can set a timing for reception strength measurement. Thereafter, when the measurement signal 35 is transmitted from the vehicle-mounted device 100, the portable device 200 that has received the measurement signal 35 can measure the reception strength. The request signal from the transmission antenna that is received by the portable device 200 may be identified on the basis of the identification information of the transmission antenna that is included in the request signal from each transmission antenna. Since a transmission order and a transmission timing of the transmission antenna are preset, the request signal from the transmission antenna may be identified by waiting for the request signal from each transmission antenna from a reception timing from the first transmission antenna.

The transmission unit 104 sequentially outputs the request signal 30 to the transmission antenna 102a, the transmission antenna 102b, the transmission antenna 102c, the transmission antenna 102d, and the transmission antenna 102e according to a preset order. Accordingly, the request signal 30 is sequentially wirelessly transmitted from the transmission antenna 102a, the transmission antenna 102b, the transmission antenna 102c, the transmission antenna 102d, and the transmission antenna 102e. Since a radio signal is attenuated as a distance from the antenna increases, the reception strength measured by the portable device 200 has a value correlated with the distance from the transmission antenna 102. Referring back to FIG. 2, the description will be continued.

The storage unit 112 is connected to the control unit 110. The storage unit 112 stores a registration ID 1122 and history information 1124. The registration ID 1122 is IDs of one or a plurality of portable devices capable of operating the vehicle 2 on which the vehicle-mounted device 100 is mounted, as described above. The history information 1124 is a history of the reception strength included in the response signal transmitted by the portable device 200. For example, information indicating the reception strength in the portable device 200 of the request signal transmitted from each of the transmission antennas 102a to 102e is stored in the storage unit 112.

History Information

Figure 4:
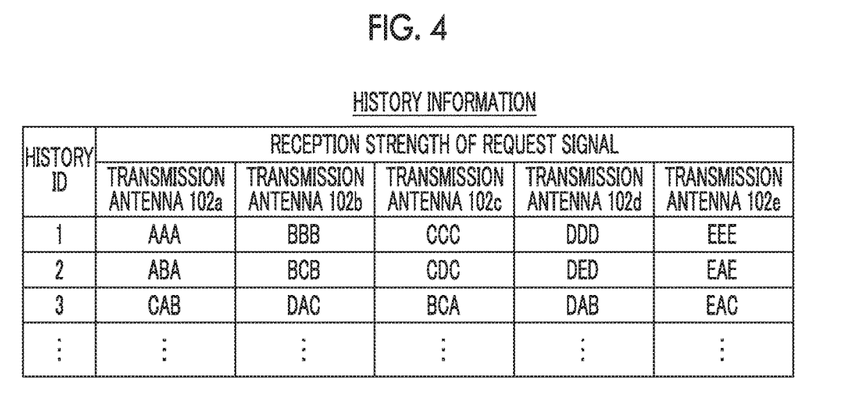
FIG. 4 is a diagram illustrating an example of history information.

FIG. 4 illustrates an example of the history information. In the history information 1124, a history ID which is identification information of the history is associated with the information indicating the reception strength of the request signal. Here, the reception strength of the request signal is stored for each transmission antenna that has transmitted the request signal. In the example illustrated in FIG. 4, a history ID "1", reception strength "AAA" in the portable device 200 of the request signal transmitted by the transmission antenna 102a, reception strength "BBB" in the portable device 200 of the request signal transmitted by the transmission antenna 102b, reception strength "CCC" in the portable device 200 of the request signal transmitted by the transmission antenna 102c, reception strength "DDD" in the portable device 200 of the request signal transmitted by the transmission antenna 102d, and reception strength "EEE" in the portable device 200 of the request signal transmitted by the transmission antenna 102e are associated with one another. Referring back to FIG. 2, the description will be continued.

The reception unit 108 includes a receiver and is connected to the control unit 110. The reception unit 108 receives the response signal transmitted by the portable device 200 via the reception antenna 106, and outputs the response signal to the control unit 110.

The control unit 110 acquires the authentication ID and the reception strength included in the response signal supplied by the reception unit 108. The control unit 110 determines whether or not the authentication ID matches the registration ID 1122 stored in the storage unit 112. In a case where the authentication ID matches the registration ID 1122, the control unit 110 determines that the authentication has succeeded, and in a case where the authentication ID does not match the registration ID 1122, the control unit 110 determines that the authentication has failed. In a case where the authentication has failed, the control unit 110 determines that the vehicle 2 is caused not to perform start of the engine.

In a case where the control unit 110 determines that the authentication has succeeded, the control unit 110 estimates a position of the portable device 200 on the basis of the reception strength acquired from the response signal. Hereinafter, the position of the portable device 200 estimated on the basis of the reception strength acquired from the response signal is referred to as a "first estimation position". For example, the control unit 110 obtains the first estimation position using triangulation or the like on the basis of the reception strength (distance) from each transmission antenna. The control unit 110 determines whether or not the first estimation position is included in an area in which start of the engine of the vehicle 2 is permitted. Here, the area in which the start of the engine is permitted is preset. For example, the area in which the start of the engine is permitted may be set to an area that is formed by a predetermined distance from the driver's seat.

In a case where the first estimation position is included in the area in which the start of the engine is permitted, the control unit 110 determines whether or not to start the engine on the basis of the reception strength acquired from the response signal and the history of the reception strength stored in the storage unit 112. For example, the control unit 110 estimates the position of the portable device 200 on the basis of the reception strength of the request signal included in the history information 1124 stored in the storage unit 112. Here, the control unit 110 may estimate the position of the portable device 200 on the basis of the reception strength of the most recent request signal or may estimate the position of the portable device 200 on the basis of previous reception strength of one or a plurality of request signals. Hereinafter, the position estimated on the basis of the reception strength of the request signal included in the history information 1124 is referred to as a "second estimation position". The control unit 110 obtains a fluctuation amount of the first estimation position relative to the second estimation position and determines whether or not the fluctuation amount is equal to or smaller than a threshold value. In a case where the control unit 110 determines that the fluctuation amount is equal to or smaller than the threshold value, the control unit 110 determines that the engine is started.

In a case where the control unit 110 determines that the engine is started, the control unit 110 outputs an engine start signal to the engine start unit 302. The engine start unit 302 starts the engine of the vehicle according to the engine start signal supplied by the control unit 110.

The engine start unit 302 performs a process of starting the engine of the vehicle 2. The door locking and unlocking unit 304 performs locking or unlocking of a door of the vehicle. The engine start switch 306 is an operation switch that is pressed by the user when the engine is started.

Configuration of Portable Device

The portable device 200 includes a transmission antenna 202, a reception antenna 206, and a circuit unit 200a. The circuit unit 200a includes a transmission unit 204, a reception unit 208, a control unit 210, and a storage unit 212. An authentication ID 2122 is stored in the storage unit 212.

The reception unit 208 includes a receiver and is connected to the reception antenna 206. The reception unit 208 sequentially receives the request signal transmitted by the plurality of respective transmission antennas of the vehicle-mounted device 100 via the reception antenna 206, and measures the reception strength of the request signal. The reception unit 208 outputs the request signal and information indicating the reception strength of the request signal to the control unit 210.

The control unit 210 includes an arithmetic processing unit such as a CPU, and is connected to the reception unit 208 and the storage unit 212. If the request signal is supplied from the reception unit 208, the control unit 210 acquires the authentication ID 2122 stored in the storage unit 212. The control unit 210 generates a response signal including the information indicating the reception strength supplied from the reception unit 208 and the authentication ID 2122, and outputs the response signal to the transmission unit 204.

The transmission unit 204 includes a transmitter, and is connected to the transmission antenna 202 and the control unit 210. The transmission unit 204 transmits the response signal supplied from the control unit 210, from the transmission antenna 202 at a frequency in a radio frequency (RF) band. For example, a frequency in 300 MHz to 950 MHz is used.

Example of Transmission of Response Signal

Figure 5:
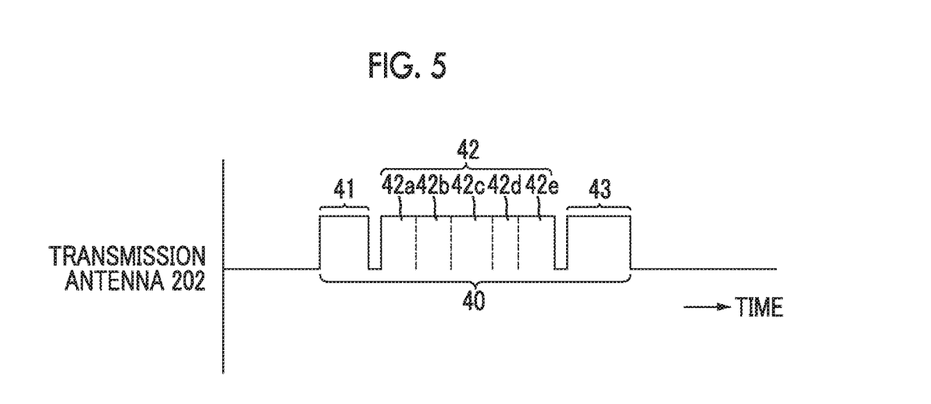
FIG. 5 is a diagram illustrating an example of a response signal transmitted by a portable device according to the embodiment.

FIG. 5 illustrates an example of the response signal transmitted by the portable device 200. In FIG. 5, a horizontal axis indicates time and a vertical axis indicates the response signal 40 that is transmitted by the transmission antenna 202. The transmission unit 204 outputs the response signal 40 to the transmission antenna 202. Accordingly, the response signal 40 is wirelessly transmitted in an RF band from the transmission antenna 202.

The response signal 40 includes a synchronization signal 41, signal strength measurement information 42 (42a, 42b, 42c, 42d, and 42e), and an ID response signal 43. As the synchronization signal 41 is transmitted from the portable device 200, the vehicle-mounted device 100 that has received the synchronization signal 41 can synchronize with the portable device 200. As the signal strength signal 42 is transmitted from the portable device 200, the vehicle-mounted device 100 that has received the signal strength signal 42 can acquire the reception strength in the portable device 200 of the request signal transmitted from each of the plurality of transmission antennas 102. For example, the reception strength of the request signal transmitted by each of the transmission antennas 102a to 102e is included in each of the signal strength signals 42a to 42e. As the ID response signal 43 is transmitted from the portable device 200, the vehicle-mounted device 100 that has received the authentication ID 2122 included in the ID response signal 43 can authenticate the portable device 200 using the authentication ID 2122.

Operation of Keyless Entry System

Figure 6:
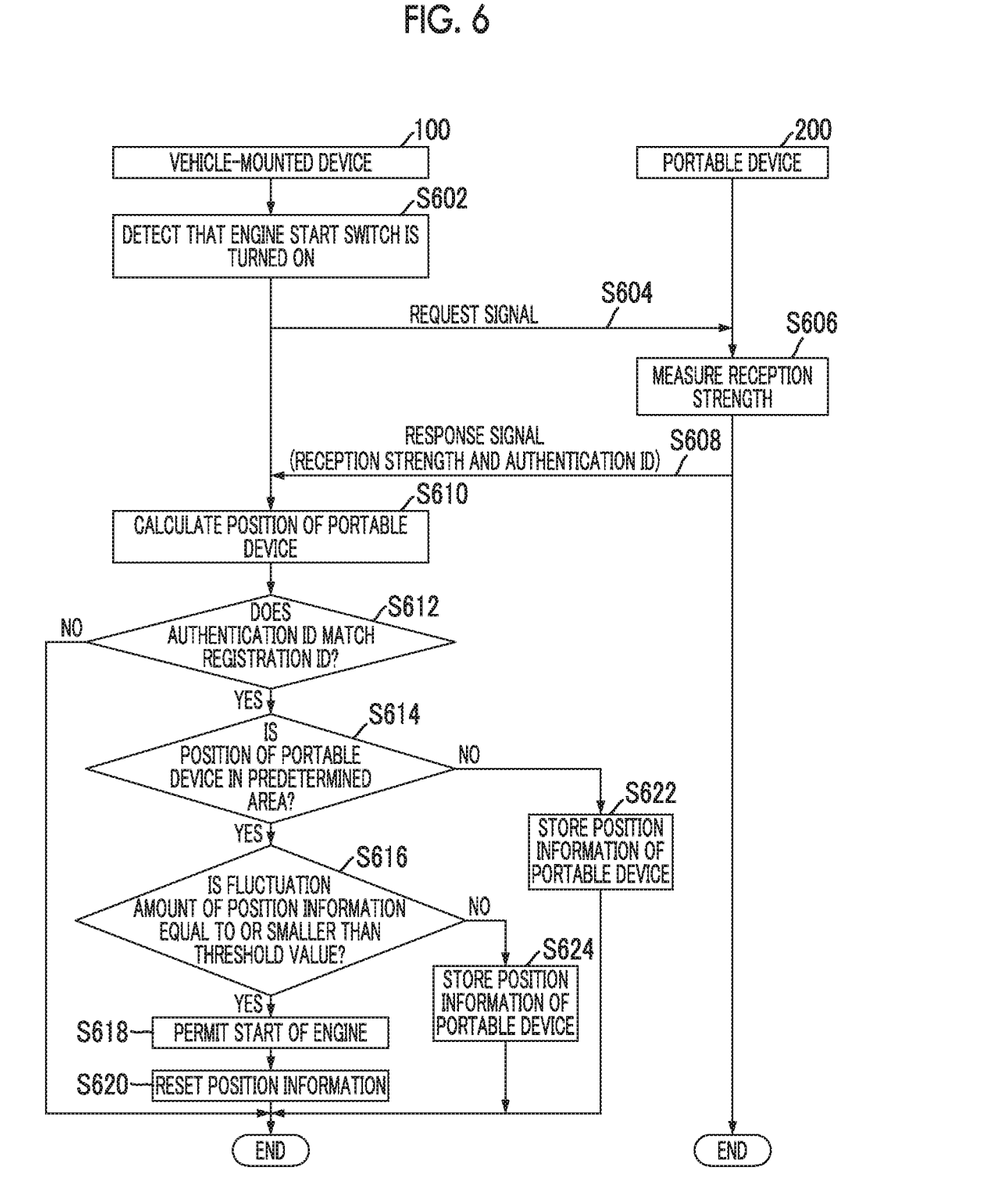
FIG. 6 is a diagram illustrating an example of an operation of the keyless entry system according to the embodiment.

FIG. 6 illustrates an example of an operation of the keyless entry system according to the embodiment.

In step S602, as the engine start switch 306 is pressed by the user, the engine start switch 306 is turned on. As the engine start switch 306 is turned on, an engine start request is output to the control unit 110 of the vehicle-mounted device 100, and the control unit 110 detects that the engine start switch 306 is turned on.

In step S604, if the control unit 110 detects that the engine start switch 306 is turned on, the control unit 110 generates a request signal and outputs the request signal to the transmission unit 104. The transmission unit 104 sequentially transmits the request signal supplied by the control unit 110, from the transmission antennas 102*a* to 102*e*.

In step S606, the reception unit 208 of the portable device 200 receives the request signal transmitted by the vehicle-mounted device 100 and measures the reception strength of the request signal.

In step S608, the control unit 210 of the portable device 200 generates a response signal including the information indicating the reception strength measured in step S606 and the authentication ID 2122, and outputs the response signal to the transmission unit 204. The transmission unit 204 transmits the response signal supplied by the control unit 210, from the transmission antenna 202.

In step S610, if the response signal is received by the reception unit 108, the control unit 110 of the vehicle-mounted device 100 acquires the reception strength and the authentication ID included in the response signal. The control unit 110 calculates a position (first estimation position) of the portable device 200 on the basis of the reception strength acquired from the response signal.

In step S612, the control unit 110 of the vehicle-mounted device 100 determines whether the authentication ID matches the registration ID 1122 stored in the storage unit 112. The control unit 110 ends the process in a case where the authentication ID does not match the registration ID. In this case, the start of the engine is not executed.

Step S614 is executed in a case where the control unit 110 determines that the authentication ID matches the registration ID. In step S614, the control unit 110 determines whether the first estimation position calculated in step S610 is in a predetermined area such as an area in which start of the engine of the vehicle 2 is permitted.

Step S616 is executed in a case where the control unit 110 determines that the first estimation position is within the predetermined area. In step S616, the control unit 110 determines whether or not a fluctuation amount of the first estimation position relative to the second estimation position estimated on the basis of the reception strength stored in the history information 1124 stored in the storage unit 112 is equal to or smaller than a threshold value.

Step S618 is executed in a case where the fluctuation amount of the first estimation position relative to the second estimation position is determined to be equal to or smaller than the threshold value. In step S618, the control unit 110 permits the start of the engine. In this case, the control unit 110 outputs an engine start signal to the engine start unit 302. The engine start unit 302 starts the engine of the vehicle according to the engine start signal supplied by the control unit 110.

In step S620, the control unit 110 resets the first position information.

Step S622 is executed in a case where the control unit 110 determines that the first estimation position is not within the predetermined area in step S614. In step S622, the control unit 110 stores the position information (first estimation position) of the portable device 200. In this case, start of the engine is not executed.

Step S624 is executed in a case where the control unit 110 determines that the fluctuation amount of the first estimation position relative to the second estimation position is larger than the threshold value in step S616. In step S624, the control unit 110 stores the position information (first estimation position) of the portable device 200. In this case, the start of the engine is not executed.

In an example of the operation of the keyless entry system illustrated in FIG. 6, an order of step S612, step S614, and step S616 may be changed.

In the above-described embodiment, the case where the control unit 110 calculates the second estimation position and determines whether or not the engine is started on the basis of the first estimation position and the second estimation position has been described, but the present invention not limited to this example. For example, the control unit 110 may determine whether or not the engine is started on the basis of the reception strength acquired from the response signal and the history of the reception strength stored in the storage unit 112 in a case where the first estimation position is included in the area in which the start of the engine is permitted. For example, the control unit 110 may obtain the fluctuation amount of the reception strength included in the response signal relative to the reception strength of the request signal transmitted by each transmission antenna included in the history information 1124 stored in the storage unit 112, determine to perform the start of the engine in a case where the fluctuation amount is determined to be equal to or smaller than the threshold value, and determine not to perform the start of the engine in a case where the fluctuation amount is determined to be larger than the threshold value. Further, when it is determined that the fluctuation amount is larger than the threshold value, the start of the engine may be set not to be performed when the engine start switch 306 is pressed for a predetermined time.

Further, in the above-described embodiment, the case where the vehicle-mounted device 100 stores the history of reception strength of the request signal has been described, but the present invention is not limited to this example. For example, the vehicle-mounted device 100 may store the history of the second estimation position estimated on the basis of the reception strength of the request signal. Thus, in a case where the engine start switch 306 is pressed, it is possible to determine whether or not to start the engine without calculating the second estimation position.

Further, in the above-described embodiment, the case where the control unit 110 of the vehicle-mounted device 100 determines whether or not the fluctuation amount of the first estimation position relative to the second estimation position estimated on the basis of the reception strength stored in the history information 1124 stored in the storage unit 112 is equal to or smaller than the threshold value has been described, but the present invention is not limited to this example. For example, the control unit 110 may determine that the start of the engine is performed in a case where a difference between the second estimation position and the first estimation position is determined to be equal to or smaller than the threshold value on the basis of the difference, and determine that the start of the engine is not performed in a case where the difference is determined to be larger than the threshold value. Further, for example, the control unit 110 may determine that the start of the engine is performed in a case where a change rate of the first estimation position relative to the second estimation position is determined to be equal to or smaller than the threshold value on the basis of the change rate, and determine that the start of the engine is not performed in a case where the change rate is determined to be larger than the threshold value. Further, for example, the control unit 110 obtains a plurality of second estimation positions including a previous second estimation position on the basis of the reception strength stored in the history information 1124 stored in the storage unit 112. The control unit 110 may determine that the start of the engine is performed in a case where a moving average of the fluctuation amount of the first estimation position relative to each of the plurality of second estimated positions is determined to be equal to or smaller than the threshold value on the basis of the moving average, and determine that the start of the engine is not performed in a case where the moving average is determined to be larger than the threshold value.

In the above-described embodiment, the control unit 110 may count the number of times the engine start has not been continuously permitted even when the engine start switch 306 is pressed. The control unit 110 may be sound an alarm in a case where the counted number of times exceeds a threshold value. Accordingly, it is possible to inform that the vehicle is operated by a fraudulent action. Further, the control unit 110 may change the threshold value on the basis of the history information 1124. For example, the control unit 110 changes the threshold value according to the fluctuation amount in a case where the fluctuation amount of the first estimation position relative to the second estimation position is larger than the threshold value. For example, the control unit 110 may decrease the threshold value as the fluctuation amount increases. In a case where a fraudulent action is performed, it is conceivable that an operation from a position separated from the second estimation position is performed. Accordingly, it is conceivable that the fluctuation amount of the first estimation position relative to the second estimation position increases. It is possible to limit the number of fraudulent actions by decreasing the threshold value as the value of the fluctuation amount increases.

In the above-described embodiment, the reception antenna 206 of the portable device 200 may include a three-axis reception antenna. The reception unit 208 measures reception strengths in the three axial directions orthogonal to one another, and transmits a response signal including information indicating the reception strengths in the three axial directions and the authentication ID. The vehicle-mounted device 100 stores a history of the reception strengths in the three axial directions. If the vehicle-mounted device 100 newly receives the response signal transmitted by the portable device 200, the vehicle-mounted device 100 determines whether or not to start the engine on the basis of the reception strengths in the three axial directions included in the response signal and the stored history of the reception strengths in the three axial directions. For example, the control unit 110 of the vehicle-mounted device 100 compares a ratio of the reception strengths in the three axial directions included in the response signal with a ratio of the reception strengths in the three axial directions obtained from the history of the reception strengths in the three axial directions, permits the start of the engine in a case where the fluctuation is small, and does not permit the start of the engine in a case where the fluctuation is great.

In a case where a fraudulent action is performed, a direction of a fraudulent portable device is frequently changed so that a response signal is received by the reception antenna 106 of the vehicle-mounted device 100 as compared with a case in which the fraudulent action is not performed. Accordingly, it is conceivable that fluctuation in the direction of the fraudulent portable device increases. Since the ratio of reception strengths in the three axial directions has a correlation with the direction of the portable device 200, it is possible to improve accuracy of a determination as to whether a fraudulent action is performed, by determining whether to permit the start of the engine on the basis of the ratio of reception strengths in the three axial directions.

According to the keyless entry system according to the embodiment, the vehicle-mounted device 100 stores the history of the reception strength of the request signal that is included in the response signal to the request signal. In a case where the vehicle-mounted device 100 newly receives the response signal, the vehicle-mounted device 100 determines whether or not the vehicle 2 is caused to perform the start of the engine requested by pressing the engine start switch 306 on the basis of the reception strength and the history of the reception strength included in the response signal.

In a case where the control unit 110 determines that the vehicle 2 is caused not to perform the start of the engine for any reasons such as noise, the user presses the engine start switch 306 again. In a case where the fraudulent action is not performed, the user repeats an operation without being aware of the position or the like of the portable device 200. Accordingly, it is conceivable that the position of the portable device in each operation does not move so much. Therefore, in a case where the fraudulent action is not performed, it is conceivable that the reception strength by the portable device 200 of the request signal transmitted by the vehicle-mounted device 100 is small in fluctuation in each operation (each reception of the request signal).

On the other hand, in a case where a fraudulent action is performed, a fraudulent first portable device (relay device) that has received the request signal transmitted by the vehicle-mounted device 100, near the vehicle 2 or inside the vehicle 2, transmits information on the received request signal to a fraudulent second portable device (relay device) near a user who is at a position separated from the vehicle 2. The second portable device reproduces the request signal from the information transmitted by the first portable device. If the request signal is reproduced by the second portable device, a response signal is transmitted from the portable device 200 carried by the user. Thus, the user still is at the position separated from the vehicle 2, and the response signal is transmitted to the vehicle 2. Since the fraudulent first portable device is not tuned with the vehicle-mounted device 100 like the non-fraudulent portable device 200, the reception characteristics such as reception sensitivity are different from those of the non-fraudulent portable device 200. Therefore, it is conceivable that a person who performs a fraudulent action in order to start the engine presses the operation switch while changing a place or a direction of the fraudulent first portable device through various attempts and repeats work of receiving the request signal from the vehicle-mounted device 100, in order to obtain, with the fraudulent first portable device, reception strength from which the vehicle-mounted device 100 is caused to recognize that the portable device is in the area in which the start of the engine is permitted. Therefore, it is conceivable that the request signal reproduced by the fraudulent second portable device that has received the information on the request signal transmitted by the fraudulent first portable device is great in fluctuation in signal strength for each reproduction. Therefore, it is conceivable that fluctuation in the reception strength included in the response signal transmitted by the portable device 200 that receives the request signal reproduced by the second portable device is also great.

In a case where an operation is performed on the operation switch such as the engine start switch 306, the vehicle-mounted device 100 obtains the first estimation position and the second estimation position. In a case where the fraudulent action is performed, it is conceivable that fluctuation in the reception strength included in the response signal from the portable device 200 increases. Accordingly, it is conceivable that fluctuation in position or distance estimated on the basis of the reception strength also increases. In this embodiment, the vehicle-mounted device 100 determines that the fraudulent action is not performed in a case where fluctuation of the first estimation position relative to the second estimation position is equal to or smaller than the threshold value, and determines that the fraudulent action is performed in a case where the fluctuation is larger than the threshold value. Accordingly, it is possible to prevent the vehicle from being operated due to the fraudulent action.

Second Embodiment

FIG. 1 can be applied as an overview of a vehicle having the keyless entry system mounted thereon according to a second embodiment.

Configuration of Keyless Entry System

FIG. 2 can be applied as an example of the vehicle-mounted device 100 and the portable device 200 constituting the keyless entry system according to the second embodiment.

The portable device 200 according to the first embodiment can be applied as the portable device 200 according to the second embodiment. However, if the request signal is supplied from the reception unit 208, the control unit 210 acquires the authentication ID 2122 stored in the storage unit 212. The control unit 210 estimates the position of the portable device 200 on the basis of the information indicating the reception strength supplied from the reception unit 208. That is, the control unit 210 calculates the first estimation position. The control unit 210 generates a response signal including information indicating the first estimation position and the authentication ID 2122, and outputs the response signal to the transmission unit 204.

The vehicle-mounted device 100 according to the first embodiment can be applied as the vehicle-mounted device 100 according to the second embodiment. However, the control unit 110 acquires the information indicating the first estimation position and the authentication ID 2122 included in the response signal supplied by the reception unit 108. The control unit 110 determines whether or not the authentication ID matches the registration ID 1122 stored in the storage unit 112. The control unit 110 determines that the authentication has succeeded in a case where the authentication ID 2122 matches the registration ID 1122, and determines that the authentication has failed in a case where the authentication ID 2122 does not match the registration ID 1122. In a case where the authentication has failed, the control unit 110 determines that the start of the engine is not performed. In a case where the control unit 110 determines that the authentication has succeeded, the control unit 110 determines whether or not the first estimation position indicated by the information indicating the first estimation position acquired from the response signal is included in an area in which the vehicle 2 is permitted to start the engine. In a case where the first estimation position is included in the area in which the start of the engine is permitted, the control unit 110 determines whether to start the engine on the basis of the first estimation position acquired from the response signal and the history of the reception strength stored in the storage unit 112.

Operation of Keyless Entry System

FIG. 6 can be applied as an operation of the keyless entry system according to the embodiment. However, in step S606, the portable device 200 measures the reception strength and calculates the first estimation position on the basis of the reception strength. In step S608, the portable device 200 transmits a response signal including the first estimation position and the authentication ID to the vehicle-mounted device 100. Step S610 will be omitted.

According to the keyless entry system according to the second embodiment, the portable device 200 calculates the first estimation position on the basis of the reception strength of the request signal transmitted by the vehicle-mounted device 100. The portable device 200 generates a response signal including the first estimation position and the authentication ID, and transmits the response signal to the vehicle-mounted device 100. Since it can be determined whether or not the vehicle is caused to perform the start of the engine requested by pressing the engine start switch without calculating the first estimation position on the basis of the reception strength in the vehicle-mounted device 100, it is possible to prevent the vehicle from being operated by a fraudulent action. Further, it is possible to reduce a processing load for calculation of the first estimation position in the vehicle-mounted device 100.

Modification Example (Part 1)

FIG. 1 can be applied as an overview of a vehicle on which a keyless entry system according to a modification example is mounted. FIG. 2 can be applied as an example of a vehicle-mounted device 100 and a portable device 200 constituting the keyless entry system according to the modification example.

The vehicle-mounted device 100 according to the first embodiment can be applied as the vehicle-mounted device 100 according to the modification example. However, in a case where the authentication is determined to have succeeded, the control unit 110 estimates a distance from the reference position on the basis of the reception strength acquired from the response signal. Hereinafter, the distance from the reference position estimated on the basis of the reception strength acquired from the response signal is referred to as a "first estimation distance". For example, the reference position is a predetermined transmission antenna, an operation position, a vehicle-mounted device, or the like. In a case where the transmission antenna is the reference position, the first estimation distance is obtained directly from the reception strength. In a case where the operation position, the vehicle-mounted device, or the like is the reference position, the first estimation distance is estimated from a position relationship between the reference position and the transmission antenna, and the reception strength. The control unit 110 determines whether or not the position of the portable device 200 is included in the area in which the vehicle 2 is permitted to start the engine, on the basis of the first estimation distance.

Further, the control unit 110 estimates the distance from the reference position on the basis of the reception strength of the request signal included in the history information 1124 stored in the storage unit 112. Hereinafter, the distance estimated on the basis of the reception strength of the request signal included in the history information 1124 is referred to as a "second estimation distance". The control unit 110 obtains the fluctuation amount of the first estimation distance relative to the second estimation distance, and determines whether or not the fluctuation amount is equal to or smaller than a threshold value. In a case where the control unit 110 determines that the fluctuation amount is equal to or smaller than the threshold value, the control unit 110 determines that the vehicle 2 is caused to perform the start of the engine, and in a case where the control unit 110 determines that the fluctuation amount is larger than the threshold value, the control unit 110 determines that the vehicle 2 is caused not to perform the start of the engine.

FIG. 6 can be applied as an operation of the keyless entry system. However, in step S610, the vehicle-mounted device 100 calculates the first estimation distance. In step S616, the control unit 110 determines whether or not the fluctuation amount of the first estimation distance relative to the second estimation distance is equal to or smaller than a threshold value.

Further, the portable device 200 may calculate the first estimation distance. The portable device 200 transmits a response signal including the first estimation distance and the authentication ID 2122 to the vehicle-mounted device 100. Accordingly, it is possible to reduce a processing load of calculation of the first estimation distance in the vehicle-mounted device 100.

Further, the control unit 110 may obtain the second estimation distance on the basis of the reception strength of the request signal included in the history information 1124 stored in the storage unit 112, and store a history of the second estimation distance. Thus, in a case where the engine start switch 306 is pressed, it is possible to determine whether or not to start the engine without calculating the second estimation position.

According to the keyless entry system according to the modification example, it is possible to prevent the vehicle from being operated by a fraudulent action since it is possible to determine whether to start the engine using the first estimation distance and the second estimation distance instead of the first estimation position and the second estimation position.

Modification Example (Part 2)

FIG. 1 can be applied as an overview of the vehicle having the keyless entry system mounted thereon according to the modification example. FIG. 2 can be applied as an example of the vehicle-mounted device 100 and the portable device 200 constituting the keyless entry system according to the modification example.

The vehicle-mounted device 100 according to the first embodiment can be applied as a vehicle-mounted device 100 according to the modification example. However, in a case where the authentication is determined to have succeeded, the control unit 110 estimates a direction from the reference position on the basis of the reception strength acquired from the response signal. Hereinafter, the direction from the reference position estimated on the basis of the reception strength acquired from the response signal is referred to as a "first estimation direction". For example, the reference position is a predetermined transmission antenna, an operation position, a vehicle-mounted device, or the like.

Further, when the authentication is determined to have succeeded, the control unit 110 may obtain the first estimation distance on the basis of the reception strength acquired from the response signal. In this case, the control unit 110 determines whether or not the position of the portable device 200 is included in the area in which the vehicle 2 is permitted to start the engine on the basis of the first estimation distance.

Further, the control unit 110 estimates the direction from the reference position on the basis of the reception strength of the request signal included in the history information 1124 stored in the storage unit 112. Hereinafter, the direction from the reference position estimated on the basis of the reception strength of the request signal included in the history information 1124 is referred to as a "second estimation direction". The control unit 110 obtains the fluctuation amount of the first estimation direction relative to the second estimation direction, and determines whether or not the fluctuation amount is equal to or smaller than a threshold value. In a case where the fluctuation amount is determined to be equal to or smaller than the threshold value, the control unit 110 determines that the vehicle 2 is caused to perform the start of the engine.

FIG. 6 can be applied as an operation of the keyless entry system. However, in step S610, the vehicle-mounted device 100 calculates the first estimation direction. In step S616, the control unit 110 determines whether or not the fluctuation amount of the first estimation direction relative to the second estimation direction is equal to or smaller than a threshold value.

Further, the portable device 200 may calculate the first estimation direction. The portable device 200 transmits a response signal including the first estimation direction and the authentication ID to the vehicle-mounted device 100. Accordingly, it is possible to reduce a processing load of calculation of the first estimation direction in the vehicle-mounted device 100.

Further, the control unit 110 may obtain the second estimation direction on the basis of the reception strength of the request signal included in the history information 1124 stored in the storage unit 112, and store a history of the second estimation direction. Thus, in a case where the engine start switch 306 is pressed, it is possible to determine whether or not to start the engine without calculating the second estimation direction.

According to the keyless entry system according to the modification example, it is possible to prevent the vehicle from being operated by a fraudulent action since it is possible to determine whether to start the engine using the first estimation direction and the second estimation direction instead of the first estimation position and the second estimation position.

In the embodiments and the modification example described above, the case where the vehicle-mounted device includes five transmission antennas and one reception antenna has been described, the present invention is not limited to this example. For example, the vehicle-mounted device may include one to four transmission antennas or may include six or more transmission antennas. Further, the vehicle-mounted device may include two or more reception antennas. Further, in the embodiments and the modification example described above, the case in which the transmission antenna is provided near a door outer handle of a right front door, near a door outer handle of a left front door, and near a door outer handle of a rear gate door, but the present invention is not limited to this example. For example, the transmission antenna may be provided in a portion of a door mirror. Further, the case in which the transmission antennas and the reception antennas are provided between a driver's seat and a passenger's seat and in a portion of a dashboard in a vehicle interior has been described, but the present invention is not limited to this example. For example, the transmission antenna or the reception antenna may be provided in a portion of an instrument panel or a portion of a glove box.

Further, in the embodiments and the modification example described above, the case where the reception strength is applied as an example of reception characteristics measured by the portable device 200 has been described, but the present invention is not limited to this example. For example, electric field strength or received power may be applied as the reception characteristics.

In the embodiments and the modification example described above, the case where the start of the engine is performed by the user carrying the portable device 200 has been described, but the present invention is not limited to this example. For example, the present invention is also applicable to the case where the locking or unlocking of the door of the vehicle is performed. For example, if the user touches a door outer handle portion of a right front door, presses an operation switch near a door, or moves a doorknob, request signals are sequentially transmitted from the plurality of respective transmission antennas 102, and the portable device 200 that has sequentially received the request signals measures reception characteristics of the request signals. The portable device 200 generates a response signal including information indicating the reception characteristics of the request signals transmitted from the plurality of respective transmission antennas 102 and the authentication ID 2122, and transmits the response signal to the vehicle-mounted device 100. If the vehicle-mounted device 100 newly receives the response signal transmitted by the portable device 200, the vehicle-mounted device 100 acquires the authentication ID and the reception characteristics included in the response signal. The vehicle-mounted device 100 collates the authentication ID acquired from the response signal with the registration ID. In a case where the authentication ID is included in the registration ID as a result of collating the authentication ID acquired from the response signal with the registration ID, the vehicle-mounted device 100 determines whether or not the vehicle 2 is caused to perform locking or unlocking of the door on the basis of the reception characteristics included in the response signal and the stored history of the reception characteristics. Further, in this case, in a case where the vehicle 2 is determined not to perform the locking or unlocking of a door, locking or unlocking may be set not to be performed even when a lock or unlock switch is operated for a predetermined time.

In the above-described embodiment, the case where the history of three previous reception strengths is stored as an example of the history information as illustrated in FIG. 4 has been described, but the present invention is not limited to this example. For example, a history of one or two previous reception strengths may be stored or a history of four or more previous reception strengths may be stored.

Although the embodiment and the modification examples thereof have been described above, the embodiments and the modification examples have been presented by way of example and are not intended to limit the scope of the invention. The embodiments and the modification examples can be embodied in various other forms, and various omissions, substitutions, changes, and combinations can be made without departing from the gist of the invention. The embodiments and the modification examples are included in the scope or the gist of the invention and are included in the invention defined in claims and equivalents thereof.

The vehicle-mounted device and the portable device (hereinafter referred to as "each device") described above include a computer provided therein. The steps of each process of each device described above are stored in the form of a program in a computer-readable recording medium, and the computer reads and executes this program such that the process is performed. Here, the computer-readable recording medium refers to a magnetic disk, a magneto-optical disc, a CD-ROM, a DVD-ROM, a semiconductor memory, or the like. Further, this computer program may be distributed to a computer by a communication line, and the computer that has received this distribution may execute the program.

Further, the program may be a program for realizing some of the above-described functions. Further, the program may be a program capable of realizing the above-described functions in combination with a program previously recorded in a computer system, that is, a differential file (a differential program).

In the embodiments and the modification example described above, the control unit 110 is an example of a first control unit, the transmission unit 104 is an example of a first transmission unit, the reception unit 108 is an example of the first reception unit, and the storage unit 112 is an example of a storage unit. Further, the reception unit 208 is an example of a second reception unit, the control unit 210 is an example of a second control unit, and the transmission unit 204 is an example of a second transmission unit.

It should be understood by those skilled in the art that various modifications, combinations, sub-combinations and alterations may occur depending on design requirements and other factors insofar as they are within the scope of the appended claims of the equivalents thereof.

What is claimed is:

1. A keyless entry system comprising a vehicle-mounted device and a portable device,
wherein the vehicle-mounted device includes:
a first control unit that sequentially generates request signals;
a plurality of transmission antennas;
a first transmission unit that sequentially transmits the request signals through each of the plurality of transmission antennas;
a first reception unit that receives response signals responding to the respective request signals, each response signal including reception characteristics of the corresponding request signal received by the portable device; and
a storage unit that stores a history of the reception characteristics included in the response signals received by the first reception unit for each of the plurality of transmission antennas,
wherein the portable device includes:
a second reception unit that receives the request signals sequentially transmitted through the plurality of transmission antennas from the vehicle-mounted device;
a second control unit that generates the response signals each including the reception characteristics associated with the corresponding request signal received by the second reception unit, and
a second transmission unit that transmits the response signals generated by the second control unit,
wherein, if the first reception unit receives a new response signal, the first control unit determines whether or not to cause the vehicle to perform a predetermined operation based on the reception characteristics included in the new response signal and the history of the reception characteristics included in at least one previously-received response signal and stored in the storage unit, and the first control unit determines to cause the vehicle to perform the predetermined operation if an amount of change in the reception characteristics included in the new response signal compared with the reception characteristics in the history of the reception characteristics stored in the storage unit is equal to or smaller than a threshold value.

2. The keyless entry system according to claim 1, wherein one of the reception characteristics of the request signal is a reception strength of the request signal received by the second reception unit.

3. The keyless entry system according to claim 1, wherein the first control unit calculates a first estimated value from the reception characteristics of the request signal transmitted through each of the plurality of the transmission antennas included in the new response signal, and a second estimated value from the corresponding reception characteristics in the history of the reception characteristics stored in the storage unit, and determines an amount of change in the first estimated value with respect to the second estimated value.

4. The keyless entry system according to claim 1, wherein the history of the reception characteristics in the storage unit is a history of a value estimated from the reception characteristics included in the at least one previously-received response signal, and
the first control unit determines whether or not to cause the vehicle to perform the predetermined operation based on a value estimated from the reception characteristics of the request signal transmitted through each of the plurality of transmission antennas included in the new response signal and the history of the estimated value stored in the storage unit.

5. The keyless entry system according to claim 1, wherein the reception characteristics include a value estimated from the request signal received by the second reception unit,
the history of the reception characteristics in the storage unit is a history of the estimated value included in the at least one previously received response signal, and
the first control unit determines whether or not to cause the vehicle to perform the predetermined operation based on the estimated value included in the new response signal and the history of the estimated value stored in the storage unit.

6. The keyless entry system according to claim 3, wherein the first and second estimated values are any one of a distance from a reference position, a position of the portable device, and a direction from the reference position.

7. A vehicle-mounted device, comprising:
a control unit that sequentially generates request signals;
a plurality of transmission antennas;
a transmission unit that sequentially transmits the request signals generated by the control unit through each of the plurality of transmission antennas;
a reception unit that receives response signals responding to the request signals from a portable device, each response signal including reception characteristics of the corresponding request signal received by the portable device; and
a storage unit that stores a history of the reception characteristics included in the response signals received by the reception unit,
wherein, if a new response signal is received by the reception unit, the control unit determines whether or not to cause the vehicle to perform a predetermined operation based on the reception characteristics included in the new response signal and the history of the reception characteristics included in at least one previously-received response signal and stored in the storage unit, and the control unit determines to cause the vehicle to perform the predetermined operation if an amount of change in the reception characteristics included in the new response signal compared with the reception characteristics in the history of the reception characteristics stored in the storage unit is equal to or smaller than a threshold value.

8. The vehicle-mounted device according to claim 7, wherein one of the reception characteristics of the request signal is a reception strength of the request signal received by the second reception unit.

9. The vehicle-mounted device according to claim 7, wherein
the first control unit calculates a first estimated value from the reception characteristics of the request signal transmitted through each of the plurality of the transmission antennas included in the new response signal, and a second estimated value from the corresponding reception characteristics in the history of the reception characteristics stored in the storage unit, and determines an amount of change in the first estimated value with respect to the second estimated value.

10. The vehicle-mounted device according to claim 9, wherein the first and second estimated values are any one of a distance from a reference position, a position of the portable device, and a direction from the reference position.

11. The vehicle-mounted device according to claim 7, wherein
the history of the reception characteristics in the storage unit is a history of a value estimated from the reception characteristics included in the at least one previously-received response signal, and
the first control unit determines whether or not to cause the vehicle to perform the predetermined operation based on a value estimated from the reception characteristics of the request signal transmitted through each of the plurality of transmission antennas included in the new response signal and the history of the estimated value stored in the storage unit.

12. The vehicle-mounted device according to claim 7, wherein
the reception characteristics include a value estimated from the request signal received by the second reception unit,
the history of the reception characteristics in the storage unit is a history of the estimated value included in the at least one previously received response signal, and
the first control unit determines whether or not to cause the vehicle to perform the predetermined operation based on the estimated value included in the new response signal and the history of the estimated value stored in the storage unit.

* * * * *